US012781046B2

(12) United States Patent
Liu et al.

(10) Patent No.: US 12,781,046 B2
(45) Date of Patent: Nov. 3, 2026

(54) THERMOPLASTIC POLYCARBONATE COMPOSITIONS AND SHAPED ARTICLES THEREOF

(71) Applicant: SHPP GLOBAL TECHNOLOGIES B.V., Bergen op Zoom (NL)

(72) Inventors: Xing Liu, Shanghai (CN); Wei Shan, Shanghai (CN); Jian Wang, Shanghai (CN); Rui Gao, Shanghai (CN); Yun Zheng, Shanghai (CN); Ed Kung, Selkirk, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 654 days.

(21) Appl. No.: 18/035,877

(22) PCT Filed: Nov. 8, 2021

(86) PCT No.: PCT/IB2021/060327

§ 371 (c)(1),
(2) Date: May 8, 2023

(87) PCT Pub. No.: WO2022/101763

PCT Pub. Date: May 19, 2022

(65) Prior Publication Data

US 2023/0416525 A1 Dec. 28, 2023

(30) Foreign Application Priority Data

Nov. 10, 2020 (EP) .................................... 20206738

(51) Int. Cl.

*C08L 69/00* (2006.01)
*C08K 3/04* (2006.01)
*C08K 3/22* (2006.01)

(52) U.S. Cl.

CPC ................ *C08L 69/00* (2013.01); *C08K 3/04* (2013.01); *C08K 3/22* (2013.01); *C08K 2003/2241* (2013.01); *C08L 2201/08* (2013.01); *C08L 2205/025* (2013.01); *C08L 2205/035* (2013.01); *C08L 2207/53* (2013.01)

(58) Field of Classification Search

None
See application file for complete search history.

(56) References Cited

U.S. PATENT DOCUMENTS

| | | | | |
|---|---|---|---|---|
| 5,981,661 A | 11/1999 | Liao et al. | | |
| 5,986,016 A | 11/1999 | Puyenbroek et al. | | |
| 6,984,694 B2 | 1/2006 | Blasius et al. | | |
| 8,703,855 B2 | 4/2014 | Van De Wetering et al. | | |
| 8,871,836 B2 | 10/2014 | Aoki | | |
| 9,957,388 B2 | 5/2018 | Yamanaka et al. | | |
| 2009/0030128 A1 | 1/2009 | Chakravarti et al. | | |
| 2012/0248384 A1* | 10/2012 | van de Wetering | C08L 69/00 | 524/505 |
| 2013/0131255 A1 | 5/2013 | Pottie et al. | | |
| 2014/0326162 A1* | 11/2014 | van der Mee | C08L 83/10 | 105/345 |
| 2015/0368459 A1* | 12/2015 | Yamanaka | C08L 67/02 | 524/504 |
| 2016/0347952 A1* | 12/2016 | Schwartz | C08L 83/04 | |
| 2017/0190904 A1 | 7/2017 | Parimal et al. | | |
| 2017/0283612 A1 | 10/2017 | Sybert et al. | | |
| 2019/0153220 A1 | 5/2019 | Salleh et al. | | |
| 2020/0369875 A1 | 11/2020 | Shan et al. | | |
| 2021/0222002 A1* | 7/2021 | Liu | C08L 69/00 | |
| 2021/0403704 A1* | 12/2021 | Liu | C08L 69/00 | |

FOREIGN PATENT DOCUMENTS

| | | | |
|---|---|---|---|
| EP | 2944673 | A1 | 11/2015 |
| JP | H02202545 | A | 8/1990 |
| JP | 2014095033 | A | 5/2014 |
| WO | 2012131515 | A1 | 10/2012 |

(Continued)

OTHER PUBLICATIONS

International Search Report of the ISA/EPO mailed Jan. 26, 2022 for PCT Application No. PCT/IB2021/060327 filed on Nov. 8, 2021, 6 pages.
Written Opinion of the International Searching Authority (ISA/EPO) mailed Jan. 26, 2022 for PCT Application No. PCT/IB2021/060327 filed Nov. 8, 2021, 10 pages.
Duan et al., "Effect of Compatibilzer on PC/R-PET Alloy," Plastic Industry, Apr. 20, 2017, p. 37-41, vol. 4, with English Abstract.
European Office Action for European Application No. 21814879.9; dated May 16, 2024; 5 pages.
International Preliminary Report on Patentability for the corresponding International Application No. PCT/IB2021/060327; International Filing Date: Nov. 8, 2021; Date of Mailing: May 25, 2023; 10 pages.

(Continued)

*Primary Examiner* — Jeffrey D Washville
(74) *Attorney, Agent, or Firm* — CANTOR COLBURN LLP

(57) ABSTRACT

A thermoplastic polycarbonate composition comprising: 5 to 28 wt % of a brominated polycarbonate; 45 to 90 wt % of a homopolycarbonate having a weight average molecular weight from 20,000-25,000 grams/mole as measured via gel permeation chromatography using bisphenol A homopolycarbonate standards; 0 to 15 wt % of an aromatic poly(ester-carbonate) comprising carbonate units derived from bisphenol A, resorcinol, or a combination thereof, and ester units derived from a bisphenol, preferably bisphenol A, or resorcinol, and terephthalic acid, isoterephthalic acid, or a combination thereof, wherein a molar ratio of carbonate units to ester units ranges from 1:99 to 99:1; 2 to 10 wt % of a core-shell impact modifier; 1 to 7 wt % of an α,β-unsaturated glycidyl ester copolymer impact modifier; 0.6 to 3.5 wt % color composition comprising titanium dioxide and carbon black; wherein the wt % of each component is based on the total weight of the composition, which totals 100 wt %.

19 Claims, No Drawings

(56) References Cited

FOREIGN PATENT DOCUMENTS

| | | |
|---|---|---|
| WO | 2015106208 A1 | 7/2015 |
| WO | 2017033783 A1 | 3/2017 |
| WO | 2019130081 A1 | 7/2019 |

OTHER PUBLICATIONS

Office Action for the corresponding Chinese Application No. 202180075439.9, Date of Mailing: May 1, 2024; 13 pages, with English translation.
Office Action for the corresponding Chinese Application No. 202180075439.9, Date of Mailing: Nov. 16, 2024; 5 pages, English translation.
The extended European search report for the corresponding European Application No. 20206738.5; Filing Date: Nov. 10, 2020; Date of Mailing: May 10, 2021; 10 pages.

* cited by examiner

THERMOPLASTIC POLYCARBONATE COMPOSITIONS AND SHAPED ARTICLES THEREOF

CROSS REFERENCE TO RELATED APPLICATIONS

The present application is a National Stage application of PCT/IB2021/060327 filed Nov. 8, 2021, which claims priority to European Patent Application 20206738.5, filed Nov. 10, 2020, the contents of which are incorporated herein by reference in their entirety.

BACKGROUND

This disclosure relates to thermoplastic polycarbonate compositions, and in particular to thermoplastic polycarbonate compositions, methods of manufacture, and uses thereof.

Polycarbonates are useful in the manufacture of articles and components for a wide range of applications, from automotive parts to electronic appliances. Because of their broad use, particularly in electrical applications, it is desirable to provide polycarbonates with improved hydrolytic stability and electrical tracking resistance.

There accordingly remains a need in the art for thermoplastic polycarbonate compositions that have improved hydrolytic stability and electrical tracking resistance. It would be a further advantage if thermoplastic polycarbonate compositions had good low-temperature impact resistance, flame retardance, and a black color appearance.

SUMMARY

The above-described and other deficiencies of the art are met by a thermoplastic composition comprising: a thermoplastic polycarbonate composition comprising: 5 to 28 wt % of a brominated polycarbonate; 45 to 90 wt % of a homopolycarbonate having a weight average molecular weight from 20,000-25,000 grams/mole as measured via gel permeation chromatography using bisphenol A homopolycarbonate standards; 0 to 15 wt % of an aromatic poly(ester-carbonate) comprising carbonate units derived from bisphenol A, resorcinol, or a combination thereof, and ester units derived from a bisphenol, preferably bisphenol A, or resorcinol, and terephthalic acid, isophthalic acid, or a combination thereof, wherein a molar ratio of carbonate units to ester units ranges from 1:99 to 99:1; 2 to 10 wt % of a core-shell impact modifier; 1 to 7 wt % of an α,β-unsaturated glycidyl ester copolymer impact modifier; 0.6 to 3.5 wt % color composition comprising titanium dioxide and carbon black; 0 to 1 wt % of a hydrostabilizer, preferably an epoxy hydrostabilizer; optionally, 0.1 to 10 wt % of an additive composition; wherein the wt % of each component is based on the total weight of the composition, which totals 100 wt %.

In another aspect, a method of manufacture comprises combining the above-described components to form a thermoplastic polycarbonate composition.

In yet another aspect, an article comprises the above-described thermoplastic composition.

In still another aspect, a method of manufacture of an article comprises molding, extruding, or shaping the above-described thermoplastic composition into an article.

The above described and other features are exemplified by the following detailed description, examples, and claims.

DETAILED DESCRIPTION

Conventional polycarbonate compositions presently used in electrical connectors may not meet high-end (e.g., 1500

V) application requirements with respect to electrical tracking over the entire 300-600 V range, while also providing hydrolytic stability, low-temperature impact performance, and flame retardance. The inventors hereof have discovered polycarbonate compositions with improved electrical properties over the entire 300-600 V range, improved tracking performance, low temperature impact properties, and flame retardance. The polycarbonate compositions include a brominated polycarbonate, a homopolycarbonate, a core-shell impact modifier, an α,β-unsaturated glycidyl ester copolymer impact modifier. The polycarbonate compositions have improved tracking performance, wherein a molded sample of the composition does not show tracking after 80 drops of 0.1% ammonium chloride solution measured at both 300 V and 600 V, each as determined by ASTM D-3638-85. The hydrolytic stability of the polycarbonate compositions is also improved, wherein a molded sample of the composition displays improved molecular weight retention as compared with conventional formulations, for example, greater than 73% (2000 hours) as measured in a hydrolytic chamber at 85° C. and 85% relative humidity. The impact performance is maintained, wherein a molded sample (3.2 mm) of the composition has a notched Izod impact of greater than 260 Joules per meter (J/m) at −30° C. In addition, a black appearance (i.e., CIE L* of less than 35 according to the CIE Lab method, 10 degree observer, D65 illuminant, UV included, measured in reflectance mode) was obtained.

The thermoplastic polycarbonate compositions include a brominated polycarbonate, a homopolycarbonate, a core-shell impact modifier, an α,β-unsaturated glycidyl ester copolymer impact modifier, a color composition, optionally an aromatic poly(ester-carbonate), and optionally a hydrostabilizer. The individual components of the thermoplastic polycarbonate compositions are described in further detail below.

"Polycarbonate" as used herein means a polymer having repeating structural carbonate units of formula (1)

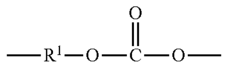

(1)

in which at least 60% of the total number of $R^1$ groups contain aromatic moieties and the balance thereof are aliphatic, alicyclic, or aromatic. In an aspect, each $R^1$ is a $C_{6-30}$ aromatic group, that is, contains at least one aromatic moiety. $R^1$ may be derived from an aromatic dihydroxy compound of the formula $HO—R^1—OH$, in particular of formula (2)

$$HO—A^1—Y^1—A^2—OH \quad (2)$$

wherein each of $A^1$ and $A^2$ is a monocyclic divalent aromatic group and $Y^1$ is a single bond or a bridging group having one or more atoms that separate $A^1$ from $A^2$. In an aspect, one atom separates $A^1$ from $A^2$. Preferably, each $R^1$ may be derived from a bisphenol of formula (3)

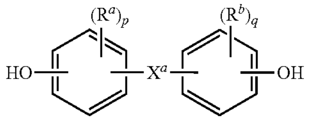

(3)

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group. In an aspect, the bridging group $X^a$ is single bond, —O—, —S—, —S(O)—, —$S(O)_2$—, —C(O)—, or a $C_{1-60}$ organic group. The organic bridging group may be cyclic or acyclic, aromatic or non-aromatic, and may further comprise heteroatoms such as halogens, oxygen, nitrogen, sulfur, silicon, or phosphorous. The 1-60 organic group may be disposed such that the $C_6$ arylene groups connected thereto are each connected to a common alkylidene carbon or to different carbons of the $C_{1-60}$ organic bridging group. In an aspect, p and q is each 1, and $R^a$ and $R^b$ are each a $C_{1-3}$ alkyl group, preferably methyl, disposed meta to the hydroxy group on each arylene group.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododemaye, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or a combination thereof.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). A combination may also be used. In a specific aspect, the polycarbonate is a linear homopolymer derived from bisphenol A, in which each of $A^1$ and $A^2$ is p-phenylene and $Y^1$ is isopropylidene in formula (3).

The thermoplastic polycarbonate compositions include a homopolycarbonate (wherein each $R^1$ in the polymer is the same). In an aspect, the homopolycarbonate in the thermoplastic polycarbonate composition is derived from a bisphenol of formula (2), preferably bisphenol A, in which each of $A^1$ and $A^2$ is p-phenylene and $Y^1$ is isopropylidene in formula (2). The homopolycarbonate may have an intrinsic viscosity, as determined in chloroform at 25° C., of 0.3-1.5 deciliters per gram (dl/gm), preferably 0.45-1.0 dl/gm. The homopolycarbonate may have a weight average molecular weight (Mw) of 10,000-200,000 grams per mol (g/mol), preferably 20,000-100,000 g/mol, as measured by gel permeation chromatography (GPC), using a crosslinked styrene-divinylbenzene column and calibrated to bisphenol A homopolycarbonate references. GPC samples are prepared at a concentration of 1 mg per ml and are eluted at a flow rate of 1.5 ml per minute. In some aspects, the homopolycarbonate is a bisphenol A homopolycarbonate having a Mw of 18,000-35,000 g/mole, preferably 20,000-25,000 g/mol; a Mw of 25,000-35,000 g/mol, preferably 27,000-32,000 g/mol; or a combination thereof, each as measured as described above.

In some aspects, the homopolycarbonate is a bisphenol A homopolycarbonate having: a melt flow rate of 20-35, preferably 25-30 $cm^3$ per 10 min at 300° C. and a 1.2 kg load and a Mw of 20,000-25,000 g/mole, preferably 21,000-23,000 g/mol; preferably a melt flow rate of 25-30 $cm^3$ per 10 min at 300° C. and a 1.2 kg load and a Mw of 20,000-25,000, g/mole, preferably 21,000-23,000 g/mole, each as measured as described above. In some aspects, the homopolycarbonate is a bisphenol A homopolycarbonate made by a melt process, a bisphenol A homopolycarbonate made by an interfacial process, or a mixture of a bisphenol A homopolycarbonate made by a melt process and a bisphenol A homopolycarbonate made by an interfacial process, wherein the bisphenol A homopolycarbonate has a Mw of 20,000-25,000, g/mole, preferably 21,000-23,000 g/mol, each as measured as described above. The total homopolycarbonate may be present, for example, from 45-90 wt %, or 50-85 wt %, each based on the total weight of the thermoplastic polycarbonate composition.

In some aspects, the homopolycarbonate is a bisphenol A homopolycarbonate made by a melt process or a mixture of a bisphenol A homopolycarbonate made by a melt process and a bisphenol A homopolycarbonate made by an interfacial process. When the bisphenol A homopolycarbonate made by a melt process is used in combination with a bisphenol A homopolycarbonate made by an interfacial process, the bisphenol A homopolycarbonate made by a melt process may be present, for example, from 10-60 wt %, 15-55 wt %, or 20-50 wt %, each based on the total weight of the thermoplastic polycarbonate composition. The bisphenol A homopolycarbonate made by an interfacial process may be present, for example, from 1-60 wt %, or 1-55 wt %, each based on the total weight of the thermoplastic polycarbonate composition.

The thermoplastic polycarbonate compositions include a brominated polycarbonate that differs from the homopolycarbonate. A combination of different brominated polycarbonates may be used. The brominated polycarbonate may be an oligomer or a polymer, and may be derived from an aromatic dihydroxy compound of formula (2) wherein each $R^h$ is bromine and n is 1 to 4; or a bisphenol of formula (3), wherein $X^a$ is as defined for formula (3), p and q are each independently 0 to 4, provided that the sum of p and q is at least 1, and $R^a$ is independently at each occurrence $C_{1-3}$ methyl, $C_{1-3}$ alkoxy, or bromine, provided that at least one $R^a$ is bromine. In an aspect, a combination of two or more different brominated aromatic dihydroxy compounds may be used. Alternatively, the brominated polycarbonate may be derived from a combination of brominated and non-brominated aromatic dihydroxy compounds. If a non-brominated aromatic dihydroxy compound is used, any of the above-described bisphenols (3) may be used. In an aspect, when a non-brominated aromatic dihydroxy compound is used, the non-brominated aromatic dihydroxy compound may be bisphenol A. If a combination of brominated and non-brominated aromatic dihydroxy compounds is used, then preferably the combination includes at least 25 mole % (mol %) of the brominated dihydroxy aromatic compound, more preferably at least 25 to 55 mol % of the brominated dihydric phenol, so as to yield a flame retardant brominated polycarbonate. Branched brominated polycarbonate oligomers may also be used, as may compositions of a linear brominated polycarbonate oligomer and a branched brominated polycarbonate oligomer. Combinations of different brominated copolycarbonate oligomers may be used. Exemplary brominated polycarbonates are disclosed in U.S. Pat. No. 4,923,933 to Curry, U.S. Pat. No. 4,170,700 to Orlando et al., and U.S. Pat. No. 3,929,908 to Orlando et al.

The brominated polycarbonate may have a bromine content of 10 to 50 wt %, 15 to 40 wt %, 20 to 30 wt %, or 24 to 27.5 wt % each based on the weight of the brominated polycarbonate. Optionally the brominated polycarbonate may have phenol or 2,4,6-tribromophenol endcaps. The brominated polycarbonate may have an intrinsic viscosity of 0.2 to 1.5 deciliter per gram, measured in methylene chloride at 25° C. Within this range, the intrinsic viscosity may be 0.4 to 1 deciliter per gram. The brominated polycarbonate may have a Mw of 1,000 to 30,000 g/mol, for example 1,000 to 18,000 g/mol, or 2,000 to 15,000 g/mol, or 3,000 to 12,000 g/mol; or, alternatively 15,000 to 25,000 g/mol, or 20,000 to 25,000 g/mol. The brominated polycarbonates may branched or linear, or a combination of branched and linear brominated polycarbonates may be used.

In an aspect, the brominated aromatic dihydroxy compound may be 2,2-bis(3,5-dibromo-4-hydroxyphenyl)propane (2',6,6'-tetrabromo-4,4'-isopropylidenediphenol (TBBPA)), bis(3,5-dibromo-4-hydroxyphenyl)menthanone, or 2,2',6,6'-tetramethyl-3,3',5,5'-tetrabromo-4,4'-biphenol; and the non-brominated aromatic dihydroxy compounds for copolymerization with the brominated aromatic dihydroxy compounds include bisphenol A, bis(4-hydroxyphenyl) methane, 2,2-bis(4-hydroxy-3-methylphenyl)propane, 4,4-bis(4-hydroxyphenyl)heptane, and (3,3'-dichloro-4,4'-dihydroxydiphenyl)methane. In another preferred aspect, the brominated polycarbonate includes brominated carbonate units derived from TBBPA and carbonate units derived from bisphenol A, and more preferably comprises 30 to 70 wt % of TBBPA and 30 to 70 wt % of bisphenol A, or 45 to 55 wt % of TBBPA and 45 to 55 wt % of bisphenol A.

The thermoplastic polycarbonate compositions may comprise, for example, 5-28 wt %, 5-25 wt %, 10-25 wt % of the brominated polycarbonate, each based on the total weight of the thermoplastic polycarbonate composition, which totals 100 wt %. The brominated polycarbonate may be used in an amount that contributes 2 to 20 wt % of bromine to the composition, based on the total weight of the composition.

The thermoplastic polycarbonate composition may include an aromatic poly(ester-carbonate). Such polycarbonates further contain, in addition to recurring carbonate units of formula (1), repeating ester units of formula (3)

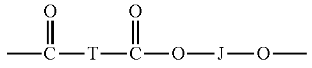

(3)

wherein J is a divalent group derived from an aromatic dihydroxy compound (including a reactive derivative thereof), such as a bisphenol of formula (2), e.g., bisphenol A; and T is a divalent group derived from an aromatic dicarboxylic acid (including a reactive derivative thereof), preferably isophthalic or terephthalic acid wherein the weight ratio of isophthalic acid to terephthalic acid is 91:9 to 2:98. Copolyesters containing a combination of different T or J groups may be used. The polyester units may be branched or linear.

In an aspect, J is derived from a bisphenol of formula (2), e.g., bisphenol A. In another aspect, J is derived from an aromatic dihydroxy compound, e.g, resorcinol. A portion of the groups J, for example up to 20 mole % (mol %) may be a $C_{2-30}$ alkylene group having a straight chain, branched chain, or cyclic (including polycyclic) structure, for example ethylene, n-propylene, i-propylene, 1,4-butylene, 1,4-cyclohexylene, or 1,4-methylenecyclohexane. Preferably, all J groups are aromatic.

Aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, or a combination thereof. Acids containing fused rings may also be present, such as in 1,4-, 1,5-, or 2,6-naphthalenedicarboxylic acids. Specific dicarboxylic acids include terephthalic acid, isophthalic acid, naphthalene dicarboxylic acid, or a combination thereof. A specific dicarboxylic acid comprises a combination of isophthalic acid and terephthalic acid wherein the weight ratio of isophthalic acid to terephthalic acid is 91:9 to 2:98. A portion of the groups T, for example up to 20 mol %, may be aliphatic, for example derived from 1,4-cyclohexane dicarboxylic acid. Preferably all T groups are aromatic.

The molar ratio of ester units to carbonate units in the polycarbonates may vary broadly, for example 1:99 to 99:1, preferably 10:90 to 90:10, more preferably 25:75 to 75:25, or 2:98 to 15:85, depending on the desired properties of the final composition.

Specific poly(ester-carbonate)s are those including bisphenol A carbonate units and isophthalate/terephthalate-bisphenol A ester units, i.e., a poly(bisphenol A carbonate)-co-(bisphenol A-phthalate-ester) of formula (4a)

In an aspect, the poly(ester-carbonate) comprises aromatic ester units and monoarylate ester units derived from the reaction of a combination of isophthalic and terephthalic diacids (or a reactive derivative thereof) with resorcinol (or a reactive derivative thereof) to provide isophthalate/terephthalate-resorcinol ("ITR" ester units). The ITR ester units may be present in the high heat poly(ester-carbonate) in an (4a)

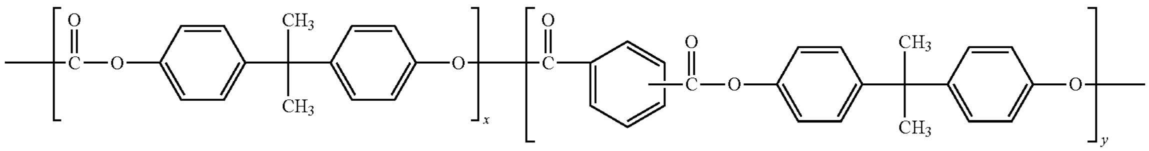

wherein x and y represent the wt % of bisphenol A carbonate units and isophthalate/terephthalate-bisphenol A ester units, respectively. Generally, the units are present as blocks. In an aspect, the weight ratio of carbonate units x to ester units y in the polycarbonates is 1:99 to 50:50, or 5:95 to 25:75, or 10:90 to 45:55. Copolymers of formula (3) comprising 35-45 wt % of carbonate units and 55-65 wt % of ester units, wherein the ester units have a molar ratio of isophthalate to terephthalate of 45:55 to 55:45 are often referred to as poly(carbonate-ester)s (PCE). Copolymers comprising amount greater than or equal to 95 mol %, preferably greater than or equal to 99 mol %, and still more preferably greater than or equal to 99.5 mol %, based on the total moles of ester units in the polycarbonate. A preferred high heat poly(ester-carbonate) comprises bisphenol A carbonate units, and ITR ester units derived from terephthalic acid, isophthalic acid, and resorcinol, i.e., a poly(bisphenol A carbonate-co-isophthalate/terephthalate-resorcinol ester) of formula (c)

(4c)

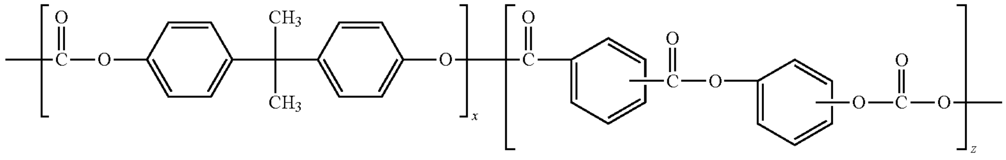

15-25 wt % of carbonate units and 75-85 wt % of ester units, wherein the ester units have a molar ratio of isophthalate to terephthalate from 98:2 to 88:12 are often referred to as poly(phthalate-carbonate)s (PPC).

In another aspect, the high heat poly(ester-carbonate) is a poly(carbonate-co-monoarylate ester) of formula (4b) that includes aromatic carbonate units (1) and repeating monoarylate ester units (4b)

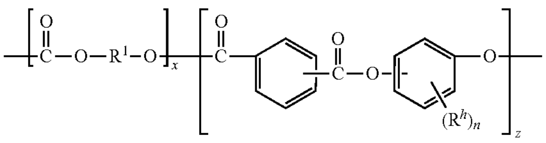

wherein $R^1$ is as defined in formula (1), and each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0-4. Preferably, each $R^h$ is independently a $C_{1-4}$ alkyl, and n is 0-3, 0-1, or 0. The mole ratio of carbonate units x to ester units z may be from 99:1 to 1:99, or from 98:2 to 2:98, or from 90:10 to 10:90. In an aspect the mole ratio of x:z is from 50:50 to 99:1, or from 1:99 to 50:50.

wherein the mole ratio of x:z is from 98:2 to 2:98, or from 90:10 to 10:90. In an aspect the mole ratio of x:z is from 50:50 to 99:1, or from 1:99 to 50:50. The ITR ester units may be present in the poly(bisphenol A carbonate-co-isophthalate-terephthalate-resorcinol ester) in an amount greater than or equal to 95 mol %, preferably greater than or equal to 99 mol %, and still more preferably greater than or equal to 99.5 mol %, based on the total moles of ester units in the copolymer. Other carbonate units, other ester units, or a combination thereof may be present, in a total amount of 1 to 20 mole %, based on the total moles of units in the copolymers, for example monoaryl carbonate units of formula (5) and bisphenol ester units of formula (3a):

(5)

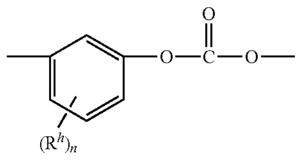

-continued (3a)

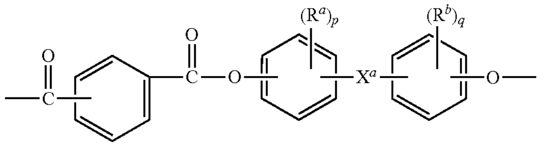

wherein, in the foregoing formulae, $R^h$ is each independently a $C_{1-10}$ hydrocarbon group, n is 0-4, $R^a$ and $R^b$ are each independently a $C_{1-12}$ alkyl, p and ci are each independently integers of 0-4, and $X^a$ is a single bond, —O—, —S—, —S(O)—, —$S(O)_2$—, —C(O)—, or a $C_{1-13}$ alkylidene of formula —$C(R^c)(R^d)$— wherein $R^c$ and $R^d$ are each independently hydrogen or $C_{1-12}$ alkyl, or a group of the formula —$C(=R^e)$— wherein $R^e$ is a divalent $C_{1-12}$ hydrocarbon group. The bisphenol ester units may be bisphenol A phthalate ester units of the formula (3b)

(3b)

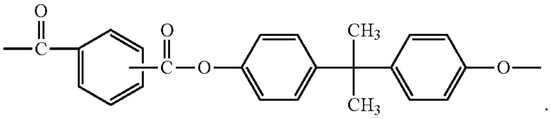

.

In an aspect, the poly(bisphenol A carbonate-co-isophthalate/terephthalate-resorcinol ester) (4c) comprises 1-90 mol % of bisphenol A carbonate units, 10-99 mol % of isophthalic acid-terephthalic acid-resorcinol ester units, and optionally 1-60 mol % of resorcinol carbonate units, isophthalic acid-terephthalic acid-bisphenol A phthalate ester units, or a combination thereof. In another aspect, poly (bisphenol A carbonate-co-isophthalate/terephthalate resorcinol ester) (6) comprises 10-20 mol % of bisphenol A carbonate units, 20-98 mol % of isophthalic acid-terephthalic acid-resorcinol ester units, and optionally 1-60 mol % of resorcinol carbonate units, isophthalic acid-terephthalic acid-bisphenol A phthalate ester units, or a combination thereof.

The poly(ester-carbonate)s may have an Mw of 2,000-100,000 g/mol, preferably 3,000-75,000 g/mol, more preferably 4,000-50,000 g/mol, more preferably 5,000-35,000 g/mol, and still more preferably 17,000-30,000 g/mol. Molecular weight determinations are performed using GPC using a cross linked styrene-divinyl benzene column, at a sample concentration of 1 milligram per milliliter, and as calibrated with bisphenol A homopolycarbonate standards. Samples are eluted at a flow rate of 1.0 ml/min with methylene chloride as the eluent.

The aromatic poly(ester-carbonate)s may be present, for example, from 0-15 wt %, 0.01-15 wt, 0-12 wt %, 0.01-12 wt %, 0-10 wt %, or 0.01-10 wt %, each based on the total weight of the thermoplastic polycarbonate composition. In some aspects, the poly(ester-carbonate) is absent.

Polycarbonates may be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) may be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups may be used. Branched polycarbonate blocks may be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of 0.05 to 2.0 wt. %. Combinations comprising linear polycarbonates and branched polycarbonates may be used.

The thermoplastic polycarbonate compositions may have improved impact resistance at −30° C. and/or −40° C. as compared with conventional formulations. To that end, the thermoplastic polycarbonate compositions include a core-shell impact modifier and an α,β-unsaturated glycidyl ester copolymer impact modifier. In some aspects, poly(carbonate-siloxane)s are absent.

The thermoplastic polycarbonate compositions include a core-shell impact modifier. In some aspects, the core-shell impact modifier is a core-shell silicone-(meth)acrylate impact modifier that includes a rubbery silicone core and a grafted rigid (meth)acrylate shell rigid shell. The silicone core may comprise dimethyl siloxane units. The (meth) acrylate monomers used to form the shell are generally a combination of a monofunctional and a copolymerizable polyfunctional (meth)acrylate monomer. Examples of monofunctional (meth)acrylate monomers include branched or straight chain ($C_{1-8}$ alkyl) (meth)acrylates and glycidyl (meth)acrylate, and examples of copolymerizable polyfunctional monomers include allyl (meth)acrylate, ethylene glycol dimethacrylate, and 1,3-butylene glycol dimethacrylate. Preferred monomers are the $C_{1-6}$ alkyl methacrylates such as methyl methacrylate. Other monomers may optionally be present in the silicone core or the rigid shell, for example, styrene, α-methylstyrene, halogen or $C_{1-3}$ alkyl substituted styrene, acrylonitrile, methacrylonitrile, maleic acid, maleic anhydride, $C_{1-4}$ alkyl and phenyl N-substituted maleimide, divinyl benzene, triallyl cyanurate, triallyl isocyanurate, diallyl phthalate, and the like.

Methods for preparing the core-shell silicone-(meth)acrylate impact modifiers are known in the art, as described for example in U.S. Pat. Nos. 7,615,594, 4,888,388, and 4,963,619. The silicone (meth)acrylate impact modifiers may be prepared by emulsion polymerization, wherein, for example a silicone rubber monomer is reacted with a first graft link monomer to form a silicone rubber latex, in the presence of a surfactant such as dodecylbenzenesulfonic acid. Alternatively, a cyclic siloxane such as cyclooctamethyltetrasiloxane and a tetraethoxyorthosilicate may be reacted with a first graft link monomer such as (gamma-methacryloxypropyl)methyl dimethoxysilane. The monofunctional (meth) acrylate monomer is then polymerized with the silicone rubber particles, optionally in presence of a cross linking monomer, such as allyl methacrylate, in the presence of a free radical generating polymerization catalyst such as benzoyl peroxide. In an aspect the impact modifier is prepared by an emulsion polymerization process that is free of basic materials such as alkali metal salts of $C_{6-30}$ fatty acids, for example sodium stearate, lithium stearate, sodium oleate, potassium oleate, and the like, alkali metal carbonates, amines such as dodecyl dimethyl amine, dodecyl amine, and the like, and ammonium salts of amines. Such materials are commonly used as surfactants in emulsion polymerization, and may catalyze transesterification or degradation of polycarbonates. Instead, ionic sulfate, sulfonate, or phosphate surfactants may be used in preparing the impact modifiers, particularly the elastomeric substrate portion of the impact modifiers. Useful surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, or a combination thereof. A specific surfactant is a $C_{6-16}$, preferably a $C_{8-12}$ alkyl sulfonate. This emulsion polymerization process is described and disclosed in various patents and literature of such companies as Dow and General Electric Company.

The core-shell silicone-(meth)acrylate impact modifier may have a rubber content of 30 to 90 wt %; and a silicon core content of 50 to 80 wt %, or 60 to 70 wt %, or 65 to 75 wt %. This silicone (meth)acrylate impact modifier may have an average particle size of 100 nanometers to 2 micrometers. In an aspect, the particle size is 200 to 400 nm, or greater than 400 nm, or greater than 500 nm.

Specific core-shell silicone-(meth)acrylate impact modifiers that may be used include those available commercially, e.g., from Mitsubishi Rayon Co. Ltd., under the trade names METABLEN S-2001, METABLEN S-2100, METABLEN S-2200, and METABLEN S-2501.

The thermoplastic polycarbonate composition may include, for example, 2-10 wt %, 3-9 wt %, or 4-8 wt % of the core-shell impact modifier, each based on the total weight of the thermoplastic polycarbonate composition.

The thermoplastic polycarbonate compositions include an α,β-unsaturated glycidyl ester copolymer impact modifier. The α,β-unsaturated glycidyl ester repeating units may have the structure:

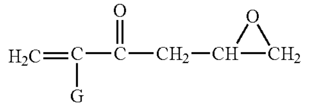

wherein G is hydrogen or a $C_{1-10}$ alkyl. Exemplary α,β-unsaturated glycidyl ester repeating units include glycidyl acrylate, glycidyl methacrylate, and glycidyl ethacrylate. In addition to the α,β-unsaturated glycidyl ester repeating units, the α,β-unsaturated glycidyl ester copolymer may further comprise repeating units derived from an α-olefin, for example ethylene, propylene, 1-butene, and 1-hexene. In some aspects, the α-olefin is ethylene. The α,β-unsaturated glycidyl ester-copolymer may further comprise repeating units derived from a vinyl ester or a $C_{1-12}$ alkyl (meth) acrylate. Examples of vinyl esters include vinyl acetate and vinyl propionate. Examples of alkyl (meth)acrylates include methyl acrylate, ethyl acrylate, butyl acrylate, 2-ethylhexyl acrylate, methyl methacrylate, ethyl methacrylate, butyl methacrylate, and 2-ethylhexyl methacrylate. In some aspects, the $C_{1-12}$ alkyl (meth)acrylate repeating units are methyl acrylate. In some aspects, the α,β-unsaturated glycidyl ester copolymer impact modifier is a copolymer of a α,β-unsaturated glycidyl ester repeating units and α-olefin repeating units. In other aspects, the α,β-unsaturated glycidyl ester copolymer impact modifier is a terpolymer of α,β-unsaturated glycidyl ester repeating units, α-olefin repeating units, and a vinyl ester repeating units, $C_{1-12}$ alkyl (meth)acrylate repeating units, or a combination thereof. In some aspects, the α,β-unsaturated glycidyl ester copolymer impact modifier comprises 60 to 99 wt % α-olefin repeating units, 0.1 to 20 wt % α,β-unsaturated glycidyl ester repeating units, and 0 to 39 wt % of vinyl ester repeating units, $C_{1-12}$ alkyl (meth)acrylate repeating units, or a combination thereof. The α,β-unsaturated glycidyl ester copolymer impact modifiers may include poly(ethylene-co-glycidyl acrylate) (E-GA), poly(ethylene-co-glycidyl methacrylate) (E-GMA), poly(ethylene-co-glycidyl methacrylate-co-methyl acrylate) (E-GMA-MA), poly(ethylene-co-glycidyl methacrylate-co-ethyl acrylate) (E-GMA-EA), poly(ethylene-co-glycidyl methacrylate-co-vinyl acetate) (E-GMA-VA), or a combination thereof. In some aspects, the α,β-unsaturated glycidyl ester copolymer impact modifier is poly(ethylene-co-glycidyl methacrylate), poly(ethylene-co-methyl acrylate-co-glycidyl methacrylate), or a combination thereof. Commercially available α,β-unsaturated glycidyl ester copolymer impact modifiers include LOTADER AX8840 (E-GMA), and LOTADER AX8900, LOTADER AX8920, and LOTADER AX8950 (E-GMA-MA).

The α,β-unsaturated glycidyl ester copolymer impact modifier may be present, for example, from 1-7 wt %, 2-8 wt %, or 2-5 wt %, each based on the total weight of the thermoplastic polycarbonate composition.

The thermoplastic polycarbonate composition includes a colorant composition. The colorant composition includes carbon black and titanium dioxide. The colorant compositions may be present, for example, from 0.6-3.5 wt %, 0.6-3 wt %, 0.6-2 wt %, 0.6-1.5 wt %, or 1-1.5 wt %, each based on the total weight of the thermoplastic polycarbonate composition. Carbon black may be present, for example, from 0.1-0.5 wt % and titanium dioxide may be present, for example, from 0.5-3 wt %, 0.5-2.5 wt %, 0.5-2.0 wt %, 0.5-1.5 wt %, or 1-1.5 wt %, each based on the total weight of the thermoplastic polycarbonate composition.

Additional colorants such as pigment and dye additives other than carbon black and titanium dioxide may also be present. Useful pigments may include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or a combination thereof.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2(1-naphthyl)-5-phenyloxazole; 2,2'-p-phenylen-bis(5-phenyloxazole); rhodamine 700; rhodamine 800; pyrene, chrysene, rubrene, coronene, or the like; or a combination thereof.

The thermoplastic composition may further include auxiliary impact modifier(s). Suitable auxiliary impact modifiers are typically high molecular weight elastomeric materials derived from olefins, monovinyl aromatic monomers, acrylic and methacrylic acids and their ester derivatives, as well as conjugated dienes. The polymers formed from conjugated dienes may be fully or partially hydrogenated. The elastomeric materials may be in the form of homopolymers or copolymers, including random, block, radial block, graft, and core-shell copolymers. Combinations of auxiliary impact modifiers may be used.

A specific type of auxiliary impact modifier is an elastomer-modified graft copolymer comprising (i) an elastomeric (i.e., rubbery) polymer substrate having a Tg less than 10° C., more preferably less than −10° C., or more preferably −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth) acrylates; elastomeric copolymers of $C_{1-8}$ alkyl (meth)acrylates with butadiene or styrene; or combinations thereof. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, preferably methyl methacrylate.

Specific elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MB S), and styrene-acrylonitrile (SAN).

Auxiliary impact modifiers may be present, for example, from 1 to 10 wt %, 0.5 to 5 wt %, 1.5 to 5 wt %, 2 to 5 wt %, or 2 to 3 wt % of the thermoplastic polycarbonate composition, each based on the total weight of the thermoplastic polycarbonate composition. In some aspects, the auxiliary impact modifier is absent.

The thermoplastic polycarbonate composition may include a hydrostabilizer. In some aspects, the hydrostabilizer is an epoxy hydrostabilizer. The epoxy hydrostabilizer may have a Mw of 2,500 to 8,500 g/mol, or 3,000 to 6,000 g/mol. The epoxy hydrostabilizer may have an epoxy equivalent weight (EEW) of 180 to 2800 g/mol, or 190 to 1400 g/mol, or 200 to 700 g/mol. In an aspect, the epoxy hydrostabilizer may comprise styrenic and acrylic groups, for example as described in US 2013/0131255 and U.S. Pat. No. 6,984,694 and commercially available under the trade names JONCRYL (e.g., JONCRYL ADR 4368 (a styrene-acrylate copolymer with epoxy functionality). Other epoxy hydrostabilizers include JONCRYL ADR 4300 (epoxidized soybean oil). The epoxy hydrostabilizer may be present, for example, from 0-1.0 wt %, 0.01-1.0 wt %, 0.01-0.5 wt %, 0.01-0.3 wt %, 0.1-0.3 wt %, or 0.1-0.2 wt %, each based on the total weight of the thermoplastic polycarbonate composition. In some aspects, the hydrostabilizer is absent.

The thermoplastic polycarbonate composition may include various additives ordinarily incorporated into polymer compositions of this type, with the proviso that the additive(s) are selected so as to not significantly adversely affect the desired properties of a thermoplastic composition, in particular electrical tracking resistance, flame retardant performance, and/or low-temperature impact properties. Such additives may be mixed at a suitable time during the mixing of the components for forming the composition. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives may be used, for example a combination of an anti-drip agent, a UV stabilizer, and a colorant. In general, the additives are used in the amounts generally known to be effective. The additive composition may be present, for example, from 0.01 to 10 wt %, 0.01-5.0 wt %, or 0.01-3 wt %, each based on the total weight of the thermoplastic polycarbonate composition.

The thermoplastic polycarbonate compositions may be manufactured by various methods known in the art. For example, the powdered polycarbonate(s), and other optional components are first blended, optionally with any fillers, in a high speed mixer or by hand mixing. The blend is then fed into the throat of a twin-screw extruder via a hopper. Alternatively, at least one of the components may be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate may be immediately quenched in a water bath and pelletized. The pellets so prepared may be one-fourth inch long or less as desired. Such pellets may be used for subsequent molding, shaping, or forming.

As discussed above, the thermoplastic polycarbonate compositions are formulated to have excellent physical properties, including excellent hydrolytic stability. Hydrolytic stability concerns the ability of a product to withstand chemical decomposition through hydrolysis, for instance by maintaining molecular weight after prolonged exposure to water. For high-end applications, such as at voltages of 1500, good hydrolytic stability and electrical tracking performance that does not compromise impact and flame retardant performance is desirable.

A molded sample of the thermoplastic polycarbonate composition may retain greater than 85% molecular weight after 2000 hours in a hydrolytic chamber at 85° C. and 85% relative humidity.

A molded sample of the thermoplastic polycarbonate composition can retain at least 60%, preferably at least 70%, 80%, 90%, or 95% notched Izod impact strength as measured at 23° C. according to ASTM D256 after 692 hours in a hydrolytic chamber at 85° C. and 85% relative humidity. A molded sample of the thermoplastic polycarbonate composition can retain at least 55%, preferably at least 60%, 65%, 70%, 75%, 80%, or 85% notched Izod impact strength as measured at 23° C. according to ASTM D256 after 1000 hours in a hydrolytic chamber at 85° C. and 85% relative humidity.

The thermoplastic polycarbonate compositions may have excellent electrical tracking performance. In some aspects, at 600 V, the number of drops required to cause tracking may be greater than or equal to 80 drops, greater than or equal to 85 drops, greater than or equal to 90 drops, greater than or equal to 95 drops, greater than or equal to 99 drops, or greater than or equal to 100 drops as determined according to ASTM D-3638-85. In some aspects, at 300 V, the number of drops required to cause tracking may be greater than or equal to 80 drops, greater than or equal to 85 drops, greater than or equal to 90 drops, greater than or equal to 95 drops, greater than or equal to 99 drops, or greater than or equal to 100 drops as determined according to ASTM D-3638-85.

A molded sample of the thermoplastic polycarbonate composition may have good low-temperature impact properties. A molded sample of the thermoplastic polycarbonate composition having a thickness of 3.2 millimeters may have a Notched Izod Impact (NII) strength of greater than 260 Joules/meter (J/m), greater than 300 J/m, greater than 350 J/m, greater than 400 J/m. greater than 450 J/m, greater than 500 J/m, from greater than 260 to 650 J/m, from greater than 260 to 600 J/m, from greater than 260 to 550 J/m, from greater than 260 to 500 J/m, from greater than 260 to 450 J/m, from greater than 260 to 400 J/m, or from greater than 260 to 350 J/m, in accordance with ASTM D256 at −30° C. A molded sample of the thermoplastic polycarbonate composition having a thickness of 3.2 millimeters may have a Notched Izod Impact (NII) strength of greater than 180 Joules/meter (J/m), greater than 200 J/m, greater than 250 J/m, greater than 300 J/m, greater than 350 J/m, greater than 400 J/m. greater than 450 J/m, greater than 500 J/m, greater than 180 to 600 J/m, greater than 180 to 550 J/m, greater than 180 to 500 J/m, greater than 180 to 450 J/m, greater than 180 to 400 J/m, greater than 180 to 350 J/m, or greater than 180 to 300 J/m in accordance with ASTM D256 at −40° C.

A molded sample of the thermoplastic polycarbonate composition may have a heat deflection temperature (HDT) of greater than 120° C. determined on one-eighth inch (3.18 mm) bars per ASTM D648 at 1.82 MPa.

A molded sample may have a UL-94 flammability test rating of V0 at a thickness of 1.5 millimeter.

The colors of molded samples of the compositions may be described using the CIE LAB color scale. When a color is expressed in CIELAB, the "L* value" describes the lightness-darkness property. If the L* value=0, the object is black. If the L* value=100 the object is white. A molded sample of the compositions may have a black color. The black color may be characterized by L* (D65 illuminant, 10 degree observer, UV included). The L* may be measured using CIE Lab method, 10 degree observer, D65 illuminant, UV included, measured in reflectance mode. The L* value may be, for example, 35 or less, 30 or less, or 25 or less, as determined for a molded sample of the composition having a thickness of 1 mm or 2 mm.

Tensile properties, including tensile modulus (TM), tensile strength (TS), and tensile elongation (TE) may be measured according to ASTM D638. The tensile modulus may be, for example, greater than 1700, or greater than 1700 to 2400 megapascals (MPa). The tensile strength may be, for example, greater than 45, or greater than 45 to 60 MPa. The tensile elongation may be, for example, greater than 65, or greater than 65 to 140 MPa.

The melt flow rate (often abbreviated MFR) of the compositions may be determined using ISO 1133 or ASTM D1238. MFR measures the mass of a composition extruded through an orifice at a prescribed temperature and load over a prescribed time period. The higher the MFR value of a polymer composition at a specific temperature, the greater the flow of that composition at that specific temperature. The melt flow rate of the compositions may be measured at 300° C. and a 1.2 kg load.

This disclosure is further illustrated by the following examples, which are non-limiting.

This disclosure further encompasses the following aspects.

Aspect 1: A thermoplastic polycarbonate composition comprising: 5 to 28 wt % of a brominated polycarbonate; 45 to 90 wt % of a homopolycarbonate having a weight average molecular weight from 20,000-25,000 grams/mole as measured via gel permeation chromatography using bisphenol A homopolycarbonate standards; 0 to 15 wt % of an aromatic poly(ester-carbonate) comprising carbonate units derived from bisphenol A, resorcinol, or a combination thereof, and ester units derived from a bisphenol, preferably bisphenol A, or resorcinol, and terephthalic acid, isophthalic acid, or a combination thereof, wherein a molar ratio of carbonate units to ester units ranges from 1:99 to 99:1; 2 to 10 wt % of a core-shell impact modifier; 1 to 7 wt % of an α,β-unsaturated glycidyl ester copolymer impact modifier; 0.6 to 3.5 wt % color composition comprising titanium dioxide and carbon black; 0 to 1 wt % of a hydrostabilizer, preferably an epoxy hydrostabilizer; optionally, 0.1 to 10 wt % of an additive composition; wherein the wt % of each component is based on the total weight of the composition, which totals 100 wt %.

Aspect 2: The thermoplastic polycarbonate composition of aspect 1, wherein a molded sample of the composition does not show tracking after at least 80 drops of an aqueous 0.1% ammonium chloride solution measured at 300 volts as determined by ASTM D-3638-85, and does not show tracking after at least 80 drops of an aqueous 0.1% ammonium chloride solution measured at 600 volts as determined by ASTM D-3638-85.

Aspect 3: The thermoplastic polycarbonate composition of aspects 1 or 2, wherein a molded sample of the composition has a black appearance wherein CIE L* is less than 35 according to CIE 1976 Lab method, 10 degree observer, D65 illuminant, UV included, measured in reflectance mode; having a 1.5 millimeter thickness has a UL 94 flame test rating of V0; having a thickness of 3.2 millimeters has a notched Izod impact of greater than 260 joules per meter at −30° C. according to ASTM D256; or a combination thereof.

Aspect 4: The thermoplastic polycarbonate composition of any one of the preceding aspects, wherein a molded sample of the composition retains greater than 73% of a molecular weight after 2000 hours in a hydrolytic chamber at 85° C. and 85% relative humidity.

Aspect 5: The thermoplastic polycarbonate composition of any one of the preceding aspects, wherein the brominated polycarbonate has a bromine content of 24 to 27.5 wt %, based on the total weight of the brominated polycarbonate, preferably wherein the brominated polycarbonate comprises brominated bisphenol A polycarbonate units.

Aspect 6: The thermoplastic polycarbonate composition of any one of the preceding aspects, wherein the poly(ester-carbonate) is absent, the hydrostabilizer is absent, a poly(carbonate-siloxane) is absent; or a combination thereof.

Aspect 7: The thermoplastic polycarbonate composition of any one of the preceding aspects, wherein the homopolycarbonate comprises a bisphenol A homopolycarbonate having a melt flow rate of 20 to 35 grams per 10 min at 300° C. and a 1.2 kilogram load, as determined by ISO 1133.

Aspect 8: The thermoplastic polycarbonate composition of any one of the preceding aspects wherein the colorant composition comprises 0.5-1.5 wt % titanium dioxide and 0.1-0.5 wt % carbon black.

Aspect 9: The thermoplastic polycarbonate composition of any one of the preceding aspects, wherein the aromatic poly(ester-carbonate) is present and is a poly (carbonate-bisphenol phthalate ester) comprising 1-50 wt % of aromatic carbonate units and 50-99 wt % of bisphenol phthalate ester units, each based on the sum of the weight of the carbonate units and the bisphenol phthalate ester units.

Aspect 10: The thermoplastic polycarbonate composition of any one of the preceding aspects, wherein the aromatic poly(ester-carbonate) is present and has the formula

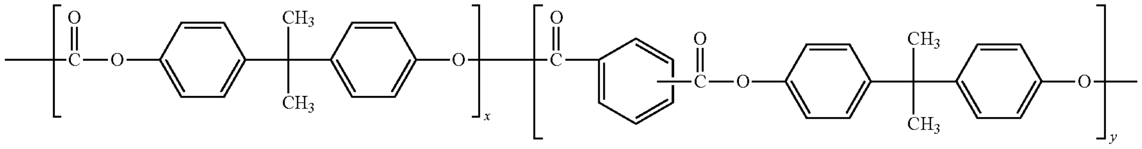

wherein a weight ratio of carbonate units x to ester units y is 10:90-45:55, and the ester units have a molar ratio of isophthalate to terephthalate from 98:2-88:12.

Aspect 11: The thermoplastic polycarbonate composition of any one of the preceding aspects, wherein a weight ratio of carbonate units x to ester units y is 75:25-85:15.

Aspect 12: The thermoplastic polycarbonate composition of any one of the preceding aspects, wherein the core-shell impact modifier comprises a silicone elastomer core and a methyl(methacrylate) copolymer shell; the α,β-unsaturated glycidyl ester copolymer impact modifier comprises poly(ethylene-co-glycidyl acrylate), poly(ethylene-co-glycidyl methacrylate), poly (ethylene-co-glycidyl methacrylate-co-methyl acrylate), poly(ethylene-co-glycidyl methacrylate-co-ethyl acrylate), poly(ethylene-co-glycidyl methacrylate-co-vinyl acetate), or a combination thereof, preferably, poly(ethylene-co-glycidyl methacrylate), poly(ethylene-co-methyl acrylate-co-glycidyl methacrylate), or a combination thereof; or a combination thereof.

Aspect 13: The thermoplastic polycarbonate composition of any one of the preceding aspects comprising: 5-25 wt %, preferably 10 to 25 wt % of the brominated polycarbonate; 1-55 wt % of a bisphenol A homopolycarbonate made by an interfacial process; 15-55 wt %, preferably 20 to 50 wt % of a bisphenol A homopolycarbonate made by a melt process; 3-9 wt %, preferably 4 to 8 wt % of the core-shell silicone-(meth) acrylate impact modifier; 2-8 wt %, preferably 2 to 5 wt % of the α,β-unsaturated glycidyl ester copolymer impact modifier; and 0.5-1.5 wt % titanium dioxide; and 0.1-0.5 wt % carbon black, wherein the wt % of each component is based on the total weight of the composition, which totals 100 wt %.

Aspect 14: An article comprising the thermoplastic polycarbonate composition of any one of the preceding aspects, preferably wherein the article is an electrical component, more preferably an electrical connector.

Aspect 15: A method for forming the article according to aspect 14, comprising molding, casting, or extruding the composition to provide the article.

The compositions, methods, and articles may alternatively comprise, consist of, or consist essentially of, any appropriate materials, steps, or components herein disclosed. The compositions, methods, and articles may additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some aspects", "an aspect", and so forth, means that a particular element described in connection with the aspect is included in at least one aspect described herein, and may or may not be present in other aspects. In addition, it is to be understood that the described elements may be combined in any suitable manner in the various aspects. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC{=}CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups may be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that may each independently be a $C_{1-9}$ alkoxy, a $C_{1-9}$ haloalkoxy, a nitro ($—NO_2$), a cyano (—CN), a $C_{1-6}$ alkyl sulfonyl ($—S(=O)_2$-alkyl), a $C_{6-12}$ aryl sulfonyl ($—S(=O)_2$-aryl)a thiol (—SH), a thiocyano (—SCN), a tosyl ($CH_3C_6H_4SO_2—$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $—CH_2CH_2CN$ is a $C_2$ alkyl group substituted with a nitrile.

While particular aspects have been described, alternatives, modifications, variations, improvements, and substantial equivalents that are or may be presently unforeseen may arise to applimayts or others skilled in the art. Accordingly, the appended claims as filed and as they may be amended are intended to embrace all such alternatives, modifications variations, improvements, and substantial equivalents.

EXAMPLES

The following components are used in the examples. Unless specifically indicated otherwise, the amount of each component is in wt %, based on the total weight of the composition.

The materials shown in Table 1 were used.

TABLE 1

| Component | Description | Source |
|---|---|---|
| PC-2 | Bisphenol A polycarbonate homopolymer, prepared by interfacial process, Mw = 21,000-23,000 g/mol as per GPC using bisphenol A homopolycarbonate standards and a melt flow rate of 25-30 grams per 10 min at 300° C. and a 1.2 kilogram load, as determined by ISO 1133. | SABIC |
| PC-4 | Amorphous bisphenol A polycarbonate homopolymer, prepared by melt process, Mw = 21,000-23,000 g/mol as per GPC using bisphenol A homopolycarbonate standards and a melt flow rate of 25-30 grams per 10 min at 300° C. and a 1.2 kilogram load, as determined by ISO 1133. | SABIC |
| Br-PC | BPA-co-2,6-tetrabromo BPA copolycarbonate, CAS Reg. No. 156042-31-8, 26 wt % bromine content, Mw = 23,600 as per GPC using bisphenol A homopolycarbonate standards. | SABIC |
| PPC | Poly(bisphenol A carbonate-bisphenol A phthalate) having 19-21 wt % bisphenol A carbonate units and 79-81 wt % bisphenol A phthalate groups with an isophthalate:terephthalate ratio of 93:7; Tg = 174° C.; Mw = 27,000-29,000 g/mol as per GPC using bisphenol A homopolycarbonate standards. | SABIC |
| UVA234 | 2-(2-hydroxy-3,5-di-cumyl)benzotriazole, CAS Reg. No. 70321-86-7 | CIBA |
| IM-Si | Core-shell impact modifier having a silicone elastomer core and an methyl(methacrylate) (MMA) copolymer shell, CAS Reg. No. 143106-82-5, having a particle size of 200-400 nm, available as METABLEN S-2501 | MITSUBISHI RAYON CO |
| EMAGMA | Poly(ethylene-co-methyl methacrylate-co-glycidyl methacrylate), CAS Reg. No. 51541-08-3, having an ethylene-methyl acrylate-glycidyl methacrylate weight ratio of 67:25:8; obtained as LOTADER AX8900. | Arkema |
| TSAN | Encapsulated Polytetrafluoroethylene, CAS Reg. No. 9002-84-0, having the tradename TSAN, with 47-53 wt % poly(tetrafluoroethylene) | SABIC |
| CESA | Styrene-acrylate-epoxy oligomer (hydrostabilizer), CAS No. 106-91-2 (JONCRYL ADR 4368) | BASF |
| PETS | Pentaerythritol tetrastearate, >90% esterified | Faci |
| Phosphite | Tris(2,4-di-tert-butylphenyl)phosphite, available as IRGAFOS 168 | BASF |
| $TiO_2$ | Titanium dioxide, CAS No. 13463-67-7 | Kronos |
| CB | Carbon black, CAS No. 1333-86-4 | Cabot |

The testing samples were prepared as described below and the following test methods were used.

Typical compounding procedures are described as follows: All raw materials are pre-blended and then extruded using a twin extruder. The composition was melt-kneaded, extruded, cooled through a water bath and pelletized. A typical extrusion profile is listed in Table 2.

TABLE 2

| Parameter | Unit | Value |
|---|---|---|
| Die | mm | 3 |
| Zone 1 Temp | ° C. | 50 |
| Zone 2 Temp | ° C. | 100 |
| Zone 3-11 Temp | ° C. | 270 |
| Die Temp | ° C. | 270 |
| Screw speed | rpm | 400 |
| Throughput | kg/hr | 40 |
| Side feeder speed | rpm | 250 |

The extruded pellets were molded into testing specimens after drying the extruded pellets at 120° C. for 3 hours using injection molding (for parameters see Table 3).

TABLE 3

| Parameters | Unit | CTI test chip | Izod bar | Flame bar |
|---|---|---|---|---|
| Cnd: Pre-drying time | Hour | 3 | 3 | 3 |
| Cnd: Pre-drying temp | ° C. | 120 | 120 | 120 |
| Hopper temp | ° C. | 50 | 50 | 50 |
| Zone 1 temp | ° C. | 300 | 275 | 300 |
| Zone 2 temp | ° C. | 300 | 280 | 300 |
| Zone 3 temp | ° C. | 300 | 285 | 300 |
| Nozzle temp | ° C. | 300 | 280 | 300 |
| Mold temp | ° C. | 100 | 75 | 100 |
| Screw speed | rpm | 100 | 100 | 100 |
| Back pressure | kgf/$cm^2$ | 68 | 68 | 68 |
| Injection speed | mm/s | 30 | 30 | 30 |
| Max. injection pressure | kgf/$cm^2$ | 1200 | 1200 | 1200 |
| Molding Machine | NONE | FANUC | FANUC | Netstal |
| Mold Type | NONE | Color chip step 1/2 | Axxicon Izod | ULA-1.5 mm |

Sample preparation and testing methods are described in Table 4.

TABLE 4

| Property | Standard | Conditions | Specimen Type |
|---|---|---|---|
| Mw | SABIC | GPC | Bar-63.5 mm × 12.7 mm × 3.2 mm |
| CTI | ASTM D3638 | 600 V, 300 V | Color chip-90 mm × 1 mm/2 mm |
| Tensile | ASTM D638 | 23° C., 3.2 mm | Bar-57.00*13.00*3.18*166 mm |
| Notched Izod | ASTM D256 | 23° C., 3.2 mm | Bar-63.5 mm × 12.7 mm × 3.2 mm |
| Flammability | UL 94 | Vertical Burning | Bar-127 mm × 12.7 mm × 3 mm/1 mm |
| CIE L* | CIE1976 | | Color chip-90 × 1 mm/2 mm |

Electrical tracking performance was assessed by measuring proof tracking index (PTI) according to ASTM D3638 (600 V, using a 90 mm×1 mm or 2 mm color chip), in which a 0.1% ammonium chloride solution was added dropwise to a sample surface at a rate of one drop per 30 seconds. A passing result was achieved when the number of drops at least 50 was required. Five chips were tested to calculate mean values.

For hydrolytic stability assessments, Izod bars were placed into a hydrolytic chamber at 85° C. and 85% relative humidity (RH) for pre-determined time intervals. The samples were then removed from the ovens for characterization of molecular weight (Mw) and impact properties. Hydrolytic stability was assessed by comparison of the weight average molecular weight of polycarbonate before and after hydrolytic stress as described above. The data was converted to % retention of the initial Mw and the data are shown in the following tables indicated as "Dual 85, Mw retention." Mw was determined by gel permeation chromatography (GPC). Hydrolytic stability was assessed by comparison of Notched Izod impact strength (NII) at 23° C. of a formulation before and after hydrolytic stress.

Impact properties were evaluated by Notched Izod impact testing (NII) at temperatures of 23° C. and −30° C. according to ASTM D256 using bars (63.5 mm×12.7 mm×3.2 mm).

Reflectance CIELab color data were determined on an X-rite ColorEye 7000A spectrophotometer (D65 light source, 10 degree observer, UV included).

Melt volume rate (MVR) was determined at 300° C. using a 1.2-kilogram weight, over 10 minutes, in accordance with ASTM D1238-04.

Heat deflection temperature (HDT) was determined on one-eighth inch (3.18 mm) bars per ASTM D648 at 1.82 MPa.

Flammability tests were performed on samples at thicknesses of 1.5, 1.2 and 1.0 mm in accordance with the Underwriter's Laboratory (UL) UL 94 standard. In some cases, a second set of 5 bars was tested to give an indication of the robustness of the rating. In this report the following definitions are used as shown in Table 5. Total flame-out-times for all 5 bars (FOT=t1+t2) were determined. V-ratings were obtained for every set of 5 bars.

TABLE 5

| | $t_1$ and/or $t_2$ | 5-bar FOT | burning drips |
|---|---|---|---|
| V0 | <10 | <50 | no |
| V1 | <30 | <250 | No |
| V2 | <30 | <250 | Yes |
| N.R. (no rating) | >30 | >250 | |

Examples 1-9

Table 6 shows the compositions and properties for Comparative Examples 1-9.

TABLE 6

| Components | Units | 1* | 2* | 3* | 4* | 5* | 6* | 7* | 8* | 9* |
|---|---|---|---|---|---|---|---|---|---|---|
| PC-2 | wt % | 38 | 23 | 21.7 | 11.7 | 10 | 0 | 28.04 | 26.74 | 48.04 |
| PC-4 | wt % | 20 | 20 | 20 | 30 | 20 | 20 | 40 | 40 | 20 |
| Br PC | wt % | 28.89 | 28.89 | 28.89 | 28.89 | 28.89 | 28.89 | 20 | 20 | 20 |
| PPC | wt % | 0 | 15 | 15 | 15 | 26.7 | 36.7 | 0 | 0 | 0 |
| PETS | wt % | 0.3 | 0.3 | 0.3 | 0.3 | 0.3 | 0.3 | 0.3 | 0.3 | 0.3 |
| UVA | wt % | 0.3 | 0.3 | 0.3 | 0.3 | 0.3 | 0.3 | 0.3 | 0.3 | 0.3 |
| TSAN | wt % | 0.3 | 0.3 | 0.3 | 0.3 | 0.3 | 0.3 | 0.3 | 0.3 | 0.3 |
| Phosphite | wt % | 0.06 | 0.06 | 0.06 | 0.06 | 0.06 | 0.06 | 0.06 | 0.06 | 0.06 |
| CESA | wt % | 0.15 | 0.15 | 0.15 | 0.15 | 0.15 | 0.15 | 0 | 0 | 0 |
| IM-Si | wt % | 7 | 7 | 7 | 7 | 7 | 7 | 7 | 7 | 7 |
| EMAGMA | wt % | 5 | 5 | 5 | 5 | 5 | 5 | 4 | 4 | 4 |

TABLE 6-continued

| Components | Units | 1* | 2* | 3* | 4* | 5* | 6* | 7* | 8* | 9* |
|---|---|---|---|---|---|---|---|---|---|---|
| CB | wt % | | | 0.3 | 0.3 | 0.3 | 0.3 | | 0.3 | |
| $TiO_2$ | wt % | | | 1 | 1 | 1 | 1 | | 1 | |
| Properties | | | | | | | | | | |
| MFR, 300° C., 1.2 kg | $cm^3$/10 min | 2.8 | 1.7 | 2.4 | 1.7 | 1.5 | 1 | 3.6 | 15.1 | 3.7 |
| HDT 1.82 MPa | ° C. | 122 | 126 | 128 | 128 | 131 | 133 | 121 | 124 | 122 |
| V0 UL-94 flame test rating, 1.5 mm | | | | | | | | Marginal | Pass | Fail |
| V0 UL-94 flame test rating, 1.0 mm | | Fail | Fail | Marginal | Pass | Pass | Pass | | | |
| V0 UL-94 flame test rating, 1.2 mm | | Pass | Marginal | Marginal | | | | Marginal | Pass | Fail |
| NII, 23° C. | J/m | 508 | 477 | 451 | 465 | 446 | 443 | 552 | 577 | 532 |
| NII, −30° C. | J/m | 214 | 267 | 229 | 193 | 229 | 228 | 287 | 358 | 294 |
| CTI 600 V | average drops | 65 | 95.4 | 87.8 | 95 | 80 | 30 | 100 | 100 | 60 |
| CTI 300 V | average drops | 20.6 | 27.6 | 100 | 50 | 53 | 44 | 49 | 65 | 64 |
| Mw, DH85 0 h | g/mol | 38796 | 45055 | 45193 | | | | | | |
| Mw, DH85 2000 h | g/mol | 35141 | 39844 | 40485 | | | | | | |
| Mw retention, DH85 2000 h | | 91% | 88% | 90% | | | | | | |
| NII, DH85, 0 h | | 508 | 477 | 451 | | | | | | |
| NII, DH85, 2000 h | | 507 | 316 | 374 | | | | | | |

*Comparative Examples

The flame test ratings in Table 6 are rated as "pass," "fail," or "marginal." "Pass" means that the flame test rating was V0 at the indicated thickness. "Fail" means that the composition had either a V1 rating, a V2 rating, or no rating as defined in Table 5. "Marginal" means that the 5 bar FOT slightly exceeded the 50 second limit required for a V0 rating.

As shown in Table 6, addition of 15 wt % PPC to mixtures of PC homopolymers PC-2 and PC-4 significantly improved CTI at 600 V (from 65 to 95.4 drops), however impact resistance was adversely affected (compare Comparative Example 2 with Comparative Example 1). As shown in Comparative Example 3, the addition of colorant composition including $TiO_2$ (1 wt %) and carbon black ("CB," 0.3 wt %), the CTI at 600 V was slightly decreased (from 95.4 to 87.8 drops) and the CTI at 300 V was substantially improved (from 27.6 to 100 drops) (compare Comparative Example 3 with Comparative Example 2). To summarize, the formulations of Comparative Examples 1-3 maintained Mw retention had good CTI at both 300 and 600 V (>80 drops), but the impact resistance at −30° C. was insufficient (<260 J/m).

As shown by comparing Comparative Example 3 with Comparative Example 4, increasing the loading of PC-4 from 20 to 30 wt % improved the flame test rating at 1.0 mm, but the CTI performance at 300 V was adversely affected. By increasing the loading of PPC (and decreasing the loading of PC-2) the HDT was improved, but the CTI performance at 600 V was adversely affected (compare Comparative Examples 5 and 6 with Comparative Example 4). To summarize, formulations of Comparative Examples 4-6 demonstrate flame test ratings of V0 at 1.0 mm, but the CTI performance at both 300 V and 600 V are insufficient (less than 80 drops) and the impact resistance at 23° C. is insufficient (less than 260 J/m).

In the compositions of Comparative Examples 7-9, PPC and the anti-hydrolytic agent ("CESA") are absent. The addition of a colorant composition including $TiO_2$ (1 wt %) and carbon black (0.3 wt %), results in an improvement in flame test performance and impact resistance at −30° C., as well as an improved CTI performance at 300 V (compare Comparative Example 8 with Comparative Example 7). As compared with Comparative Example 8, the colorant composition is absent in Comparative Example 9. Comparative Example 9 has an increased loading of the BPA homopolycarbonate made by an interfacial process ("PC-2") and a decreased loading of the BPA homopolycarbonate made by a melt process ("PC-4"), resulting in a loss in the V0 flame test rating at both the 1.5 mm and 1.2 mm thicknesses and an adverse effect on the CTI performance at 600 V. To summarize, all formulations in this group provide sufficient impact resistance (NII −30° C., >260 J/m), but do not provide the desired combination of a flame test rating of V0 at 1.5 and 1.2 mm thicknesses and sufficient CTI performance at both 300 V and 600 V.

Examples 10-20

Table 7 shows the compositions and properties for Examples 10-20.

TABLE 7

| Components | Units | 10 | 11 | 12 | 13 | 14 | 15 | 16 | 17 | 18 | 19 | 20 |
|---|---|---|---|---|---|---|---|---|---|---|---|---|
| PC-2 | wt % | 30.94 | 52.54 | 49.74 | 11.34 | 31.14 | 20.94 | 50.94 | 42.54 | 9.74 | 1.34 | 31.34 |
| PC-4 | wt % | 50 | 20 | 20 | 50 | 35 | 50 | 20 | 20 | 50 | 50 | 20 |
| PC-2 + PC-4 | wt % | 80.94 | 72.54 | 69.74 | 61.34 | 66.14 | 70.94 | 70.94 | 62.54 | 59.74 | 51.34 | 51.34 |
| Br PC | wt % | 10.8 | 16.2 | 18 | 23.4 | 17.1 | 10.8 | 10.8 | 16.2 | 18 | 23.4 | 23.4 |
| PETS | wt % | 0.3 | 0.3 | 0.3 | 0.3 | 0.3 | 0.3 | 0.3 | 0.3 | 0.3 | 0.3 | 0.3 |
| UVA | wt % | 0.3 | 0.3 | 0.3 | 0.3 | 0.3 | 0.3 | 0.3 | 0.3 | 0.3 | 0.3 | 0.3 |
| TSAN | wt % | 0.3 | 0.3 | 0.3 | 0.3 | 0.3 | 0.3 | 0.3 | 0.3 | 0.3 | 0.3 | 0.3 |

TABLE 7-continued

| Components | Units | 10 | 11 | 12 | 13 | 14 | 15 | 16 | 17 | 18 | 19 | 20 |
|---|---|---|---|---|---|---|---|---|---|---|---|---|
| Phosphite | wt % | 0.06 | 0.06 | 0.06 | 0.06 | 0.06 | 0.06 | 0.06 | 0.06 | 0.06 | 0.06 | 0.06 |
| IM-Si | wt % | 4 | 4 | 8 | 8 | 6 | 4 | 4 | 4 | 8 | 8 | 8 |
| EMAGMA | wt % | 2 | 5 | 2 | 5 | 3.5 | 2 | 2 | 5 | 2 | 5 | 5 |
| CB | wt % | 0.3 | 0.3 | 0.3 | 0.3 | 0.3 | 0.3 | 0.3 | 0.3 | 0.3 | 0.3 | 0.3 |
| $TiO_2$ | wt % | 1 | 1 | 1 | 1 | 1 | 1 | 1 | 1 | 1 | 1 | 1 |
| Properties | | | | | | | | | | | | |
| MFR, 300° C., 1.2 kg | $cm^3$/10 min | 14.2 | 6.8 | 8 | 3.6 | 6.5 | 11.5 | 10.4 | 5.5 | 5.8 | 2.7 | 2.6 |
| HDT 1.82 MPa | ° C. | 122 | 123 | 122 | 122 | 123 | 124 | 125 | 125 | 125 | 125 | 124 |
| V0 UL94 flame test rating, 1.5 mm | | Pass | Pass | Pass | Pass | Pass | Pass | Pass | Pass | Pass | Pass | Pass |
| NII 23° C. | J/m | 512 | 547 | 598 | 502 | 538 | 594 | 565 | 554 | 504 | 495 | 516 |
| NII −30° C. | J/m | 307 | 244 | 287 | 292 | 316 | 304 | 245 | 247 | 290 | 299 | 286 |
| Tensile modulus | MPa | 1920 | 1890 | 2110 | 1780 | 1900 | 2080 | 2050 | 1880 | 1920 | 1750 | 1750 |
| Tensile strength | MPa | 50 | 48 | 55 | 46 | 51 | 54 | 53 | 52 | 54 | 48 | 48 |
| Tensile elongation | MPa | 83 | 72 | 85 | 66 | 77 | 78 | 70 | 80 | 83 | 70 | 72 |
| CIE L* | | 32.6 | 33.6 | 34.2 | 34.4 | 33.9 | 32.9 | 32.8 | 33.5 | 34.5 | 34.7 | 34.7 |
| CTI, 600 V | Avg. drops | 100 | 100 | 100 | 100 | 100 | 84 | 100 | 100 | 95 | 100 | 100 |
| CTI, 300 V | Avg. drops | 100 | 97 | 100 | 90 | 100 | 100 | 84 | 92 | 91 | 100 | 90 |

As shown in Table 7, the molded compositions of Examples 10-20 provided: the desired CTI performance (i.e., greater than 80 drops) at both 300 and 600 V; a black appearance (i.e., CIE L* of less than 35); and UL-94 flame testing rating of V0 at a 1.5 mm thickness.

What is claimed is:

1. A thermoplastic polycarbonate composition comprising:

5 to 28 wt % of a brominated polycarbonate;

45 to 90 wt % of a homopolycarbonate having a weight average molecular weight from 20,000-25,000 grams/mole as measured via gel permeation chromatography using bisphenol A homopolycarbonate standards;

0 to 15 wt % of an aromatic poly(ester-carbonate) comprising carbonate units derived from bisphenol A, resorcinol, or a combination thereof, and ester units derived from a bisphenol, or resorcinol, and terephthalic acid, isophthalic acid, or a combination thereof, wherein a molar ratio of carbonate units to ester units ranges from 1:99 to 99:1;

2 to 10 wt % of a core-shell impact modifier;

1 to 7 wt % of an α,β-unsaturated glycidyl ester copolymer impact modifier;

0.6 to 3.5 wt % color composition comprising titanium dioxide and carbon black;

0 to 1 wt % of a hydrostabilizer;

optionally, 0.1 to 10 wt % of an additive composition;

wherein the wt % of each component is based on the total weight of the composition, which totals 100 wt %.

2. The thermoplastic polycarbonate composition of claim 1, wherein a molded sample of the composition does not show tracking before at least 80 drops of an aqueous 0.1% ammonium chloride solution measured at 300 volts as determined by ASTM D-3638-85, and does not show tracking before at least 80 drops of an aqueous 0.1% ammonium chloride solution measured at 600 volts as determined by ASTM D-3638-85.

3. The thermoplastic polycarbonate composition of claim 1, wherein a molded sample of the composition has a black appearance wherein CIE L* is less than 35 according to CIE 1976 Lab method, 10 degree observer, D65 illuminant, UV included, measured in reflectance mode;

having a 1.5 millimeter thickness has a UL 94 flame test rating of V0;

having a thickness of 3.2 millimeters has a notched Izod impact of greater than 260 joules per meter at −30° C. according to ASTM D256;

or a combination thereof.

4. The thermoplastic polycarbonate composition of claim 1, wherein a molded sample of the composition retains greater than 73% of a molecular weight after 2000 hours in a hydrolytic chamber at 85° C. and 85% relative humidity.

5. The thermoplastic polycarbonate composition of claim 1, wherein the brominated polycarbonate has a bromine content of 24 to 27.5 wt %, based on the total weight of the brominated polycarbonate.

6. The thermoplastic polycarbonate composition of claim 1, wherein the poly(ester-carbonate) is absent, the hydrostabilizer is absent, a poly(carbonate-siloxane) is absent; or a combination thereof.

7. The thermoplastic polycarbonate composition of claim 1, wherein the homopolycarbonate comprises a bisphenol A homopolycarbonate having a melt flow rate of 20 to 35 grams per 10 min at 300° C. and a 1.2 kilogram load, as determined by ISO 1133.

8. The thermoplastic polycarbonate composition of claim 1 wherein the colorant composition comprises 0.5-1.5 wt % titanium dioxide and 0.1-0.5 wt % carbon black.

9. The thermoplastic polycarbonate composition of claim 1, wherein the aromatic poly(ester-carbonate) is present and is a poly(carbonate-bisphenol phthalate ester) comprising 1-50 wt % of aromatic carbonate units and 50-99 wt % of bisphenol phthalate ester units, each based on the sum of the weight of the carbonate units and the bisphenol phthalate ester units.

10. The thermoplastic polycarbonate composition of claim 1, wherein the aromatic poly(ester-carbonate) is present and has the formula

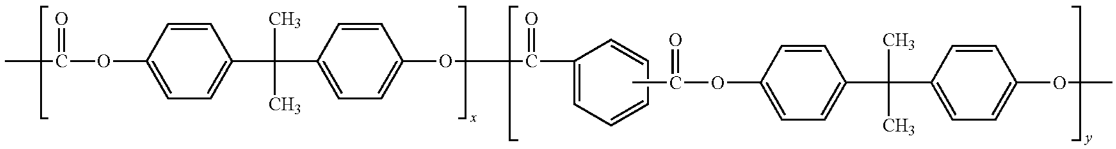

wherein a weight ratio of carbonate units x to ester units y is 10:90-45:55, and the ester units have a molar ratio of isophthalate to terephthalate from 98:2-88:12.

11. The thermoplastic polycarbonate composition of claim 1, wherein a weight ratio of carbonate units x to ester units y is 75:25-85:15.

12. The thermoplastic polycarbonate composition of claim 1, wherein the core-shell impact modifier comprises a silicone elastomer core and a methyl(methacrylate) copolymer shell;

the α,β-unsaturated glycidyl ester copolymer impact modifier comprises poly(ethylene-co-glycidyl acrylate), poly(ethylene-co-glycidyl methacrylate), poly (ethylene-co-glycidyl methacrylate-co-methyl acrylate), poly(ethylene-co-glycidyl methacrylate-co-ethyl acrylate), poly(ethylene-co-glycidyl methacrylate-co-vinyl acetate), or a combination thereof;

or a combination thereof.

13. The thermoplastic polycarbonate composition of claim 1 comprising 5-25 wt % of the brominated polycarbonate;

1-55 wt % of a bisphenol A homopolycarbonate made by an interfacial process;

15-55 wt % of a bisphenol A homopolycarbonate made by a melt process;

3-9 wt % of the core-shell silicone-(meth)acrylate impact modifier;

2-8 wt % of the α,β-unsaturated glycidyl ester copolymer impact modifier; and 0.5-1.5 wt % titanium dioxide; and 0.1-0.5 wt % carbon black, wherein the wt % of each component is based on the total weight of the composition, which totals 100 wt %.

14. An article comprising the thermoplastic polycarbonate composition of claim 1.

15. A method for forming the article according to claim 14, comprising molding, casting, or extruding the composition to provide the article.

16. The thermoplastic polycarbonate composition of claim 1, wherein the α,β-unsaturated glycidyl ester copolymer impact modifier comprises poly(ethylene-co-glycidyl methacrylate), poly(ethylene-co-methyl acrylate-co-glycidyl methacrylate), or a combination.

17. The article of claim 14, wherein the article is an electrical component.

18. The article of claim 14, wherein the article is an electrical connector.

19. A thermoplastic polycarbonate composition comprising:

5 to 28 wt % of a brominated polycarbonate;

45 to 90 wt % of a homopolycarbonate having a weight average molecular weight from 20,000-25,000 grams/mole as measured via gel permeation chromatography using bisphenol A homopolycarbonate standards;

0 to 15 wt % of an aromatic poly(ester-carbonate) comprising carbonate units derived from bisphenol A, resorcinol, or a combination thereof, and ester units derived from a bisphenol, or resorcinol, and terephthalic acid, isophthalic acid, or a combination thereof, wherein a molar ratio of carbonate units to ester units ranges from 1:99 to 99:1;

2 to 10 wt % of a core-shell impact modifier;

1 to 7 wt % of an α,β-unsaturated glycidyl ester copolymer impact modifier;

0.6 to 3.5 wt % color composition comprising titanium dioxide and carbon black;

0 to 1 wt % of a hydrostabilizer;

optionally, 0.1 to 10 wt % of an additive composition;

wherein the wt % of each component is based on the total weight of the composition, which totals 100 wt %, wherein a molded sample of the composition does not show tracking before at least 80 drops of an aqueous 0.1% ammonium chloride solution measured at 300 volts as determined by ASTM D-3638-85; and does not show tracking before at least 80 drops of an aqueous 0.1% ammonium chloride solution measured at 600 volts as determined by ASTM D-3638-85; and wherein a molded sample of the composition has a black appearance wherein CIE L* is less than 35 according to CIE 1976 Lab method, 10 degree observer, D65 illuminant, UV included, measured in reflectance mode;

having a 1.5 millimeter thickness has a UL 94 flame test rating of V0;

having a thickness of 3.2 millimeters has a notched Izod impact of greater than 260 joules per meter at −30° C. according to ASTM D256; or or a combination thereof.

* * * * *